US006446138B1

United States Patent
Criscolo et al.

(10) Patent No.: US 6,446,138 B1
(45) Date of Patent: *Sep. 3, 2002

(54) REMOTE OPERATOR INTERFACE FOR A NETWORK COMPUTER

(75) Inventors: Michael Edward Criscolo; Sanjay Gupta; Brian Michael Kerrigan; Stephen Sung; Howard Carl Tanner, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/177,873

(22) Filed: Oct. 23, 1998

(51) Int. Cl.$^7$ ................................................ G06F 3/00
(52) U.S. Cl. ............................ 710/1; 710/72; 710/129; 709/304
(58) Field of Search ..................... 710/1, 2, 5, 11, 710/63, 73–74, 101–103, 7, 15, 19, 72, 129; 709/304, 217, 218, 219; 707/10

(56) References Cited

U.S. PATENT DOCUMENTS

| | | | | |
|---|---|---|---|---|
| 4,601,011 A | * | 7/1986 | Grynberg | 364/900 |
| 4,755,691 A | * | 7/1988 | Bethea | 307/114 |
| 4,775,928 A | * | 10/1988 | Kendall et al. | 364/200 |
| 4,807,759 A | * | 2/1989 | Castner | 206/576 |
| 5,315,711 A | * | 5/1994 | Barone et al. | 395/275 |
| 5,710,804 A | * | 1/1998 | Bhame et al. | 379/58 |
| 5,734,891 A | * | 3/1998 | Saigh | 707/10 |
| 5,886,894 A | * | 3/1999 | Rakoff | 700/3 |
| 5,889,775 A | * | 3/1999 | Sawicz et al. | 370/360 |
| 6,011,372 A | * | 1/2000 | Popovich, Jr. et al. | 318/560 |
| 6,038,616 A | * | 3/2000 | Thornton et al. | 710/2 |
| 6,075,860 A | * | 6/2000 | Ketcham | 380/25 |
| 6,094,655 A | * | 7/2000 | Rogers et al. | 707/10 |

* cited by examiner

*Primary Examiner*—Jeffrey Gaffin
*Assistant Examiner*—Rijue Mai
(74) *Attorney, Agent, or Firm*—J. Bruce Schelkopf; Andrew J. Dillon

(57) ABSTRACT

A remote operator interface for a network computer is provided by a pocket-sized structural enclosure which remotely mounts input and output interface devices. The input and output devices providing a remote interface to control a network computer. The pocket-sized structural enclosure provides a means for electrically coupling the input and output interface devices to the network computer. The cable or data transmission medium which electronically couples the remote operator interface to the network computer provides a communication transmission medium for the network computer system. The pocket-sized structural enclosure can be mounted to a keyboard in close proximity to the operator of a network computer.

13 Claims, 4 Drawing Sheets

REMOTE OPERATOR INTERFACE FOR A NETWORK COMPUTER

CROSS REFERENCE TO RELATED APPLICATION

The present application is related to copending U.S. patent application Ser. No. 09/177,872 filed of an even date herewith and U.S. patent application Ser. No. 09/174,879 filed on Oct. 19, 1998. The abovementioned patent applications are assigned to the assignee of the present invention. The content of the cross referenced copending applications are hereby incorporated herein by reference thereto.

BACKGROUND OF THE INVENTION

1. Technical Field

The present invention relates in general to network computers, and in particular to a network computer which can be remotely located to minimize occupation of a work surface. Still more particularly, the present invention relates to a remote operator interface for a network computer such that a network computer can be remotely located while operated by a user.

2. Description of the Related Art

Specialized computers called "network computers" have been developed which can provide centralized control of communication between "networked" or interconnected computers. Generally, the function of network computers has evolved from "dumb terminals." A dumb terminal typically consists of a keyboard and a monitor. Dumb terminals have minimal data processing capability, minimal memory, and traditionally only display data retrieved from another, linked computer (mainframe).

Competition in the computer industry has escalated in recent years. Hence, designers of computers are investigating more and more ergonomic considerations. Further, computer designers are incorporating more ergonomic considerations into the totality of computer designs.

In a work environment, the maximization of uncluttered desk top space or work space is an important ergonomic consideration. The maximization of free space provided adjacent to a worker, enhances a worker's organizational capability and, hence a worker's productivity.

Historically, network computers and personal computers have been placed in close proximity to the operator or user. User interfaces, such as a power switch, a reset switch, an audio port, and a disk drive require frequent access by a user and, hence, close proximity of a computer to a user is necessary.

Network computers require much less user interaction than a personal computer. For example, network computers typically do not provide for the loading of bulk data via floppy disks and optical disks (i.e. CD's). However, to provide control of a network computer to an operator, a subset of the input and output hardware must be located in close proximity to the operator.

For example, referring to FIG. 1, network computer 10, generally, provides a power switch 12 for turning the network computer ON and OFF, and a light emitting diode (LED) 14 for indicating whether network computer 10 is in an ON or OFF state. Further, network computer 10 typically has a audio speaker 16, a remote headphone jack 18 and a remote microphone jack 20 for interfacing network computer 10 to a user via audio.

Additionally, network computer systems typically provide user input via a keyboard 22 and a pointing device, such as pointing device 24, and provide feedback via a display monitor 26. Many network computer operators consider a network computer chassis to be large and bulky. Current network computers configurations require the chassis of network computers to occupy a desk-top or work station to provide a user with access to necessary I/O features which are integral with the network computer chassis.

Network computers require selectable functions such as an ON/OFF switch, a reset button and the like. These few, yet necessary switches have required designers to expend considerable time and energy to decrease the size or physical structure of network computers to minimize desk top cluttering since their presence on the network computer chassis necessitate placement of the chassis in close proximity to the user.

It would therefore be advantageous to provide the necessary yet minimal user interface features of a network computer in close proximity of a user without the necessity of having the network computer chassis occupying adjacent desk-top space. It would also be advantageous to allow the remote user interface to be fastened to a keyboard or a monitor such that the location of the remote user interface is adaptable.

SUMMARY OF THE INVENTION

It is therefore one object of the present invention to provide an improved network computer.

It is another object of the present invention to provide a network computer which can be controlled while remotely located from an operator such that the occupation of a work surface can be minimized.

It is yet another object of the present invention to provide a remote operator interface for a network computer such that the network computer chassis can be remotely located from a user.

The foregoing objects are achieved as is now described. A remote operator interface for a network computer is provided by a pocket-sized structural enclosure which remotely mounts input and output interface devices. The input and output devices provide a remote interface to control a network computer. The pocket sized structural enclosure provides a means for electrically coupling the input and output interface devices to the network computer. The cable or data transmission medium which electronically couples the remote operator interface to the network computer provides a communication transmission medium for the network computer system. The pocket-sized structural enclosure can be mounted to a keyboard in close proximity to the operator of a network computer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 2:
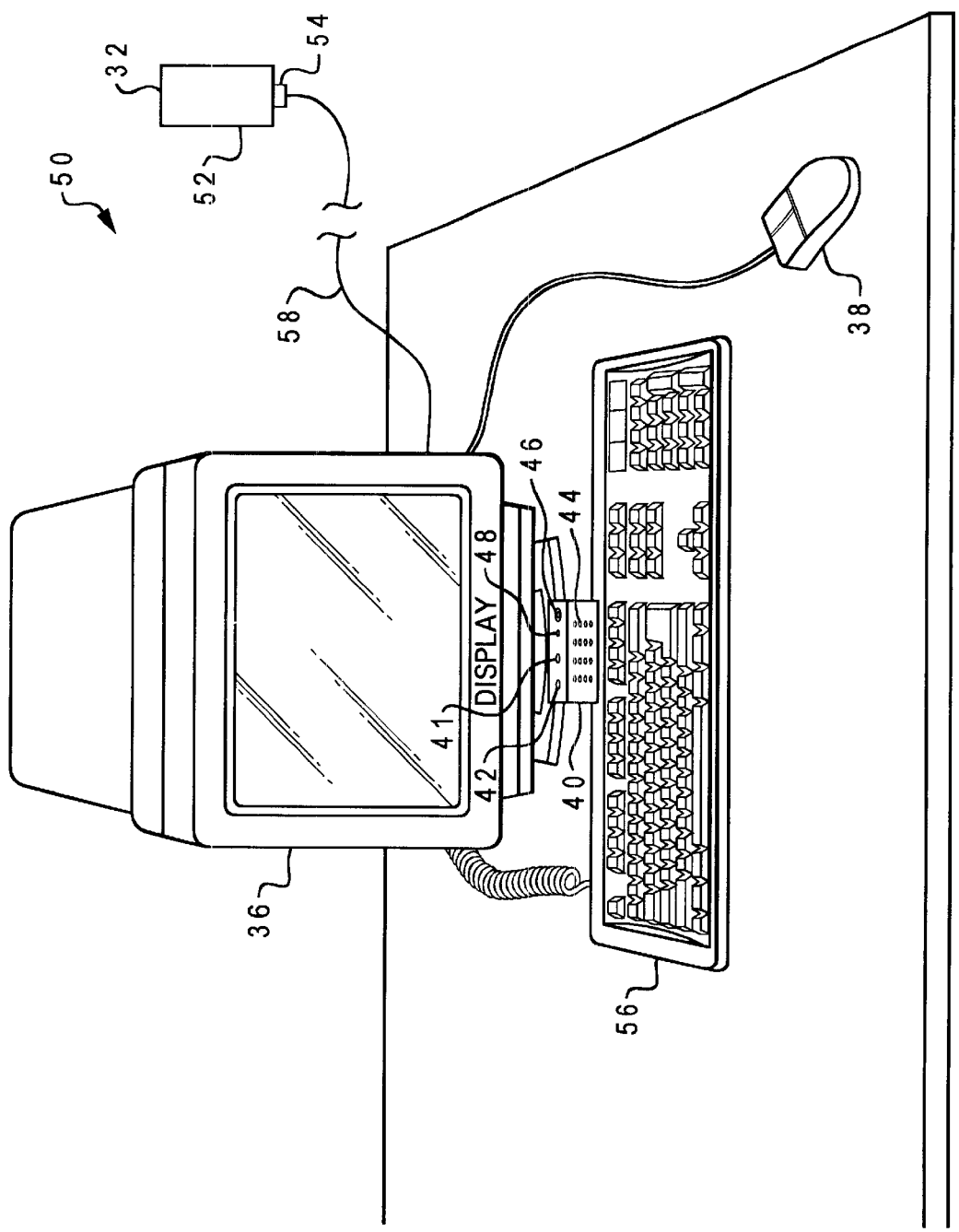
FIG. 2 is a pictorial representation of one embodiment of a network computer having a remote operator interface in accordance with the present invention.

With reference now to the figures and in particular with reference to FIG. 2, a network computer system 50 having a remotely located base unit 32, a mouse 38, a monitor 36 and a remote operator interface 40 is illustrated.

Base unit 32 provides the central data processing function of network computer system 50 and includes one or more processors, memory devices, and network adapters (not shown). In accordance with one embodiment of the present invention, remote operator interface 40 mounts the necessary input/output (I/O) features required to control network computer system 50. I/O features include speaker 44, ON/OFF switch 46, power indicator 48, microphone jack 42 and headphone jack 41. Remote operator interface 40 allows base unit 32 to be located in an adjacent room, or, if desired adjacent to or under a desk or work-station.

Connector 54 located on base unit 32 provides an interface for cable 58 to electrically interconnect remote operator interface 40 to base unit 32. The I/O features of remote operator interface 40 are duplicated on bezel 52 of base unit 32. Cable 58 and remote operator interface 40 can be disconnected from base unit 32 at connector 54 and a standard network computer system configuration without remote capability results.

When remote operator interface 40 is electrically coupled to base unit 32 a dual configuration of I/O devices are present. In a preferred embodiment, the dual configuration of I/O devices operate in harmony. In an alternate embodiment, base unit 32 determines whether a remote operator interface 40 is connected to base unit 32 and if a remote operator interface is connected to base unit 32, network computer system 50 is not responsive to input from the I/O devices which are mounted on base unit 32.

The present invention provides a significant improvement over the prior art because only a single model of base unit 32 is required to be manufactured, stocked, and marketed by a network computer manufacturer. Remote operator interface 40 can be considered as a peripheral device and connecting remote operator interface 40 to base unit 32 provides immediate remote functionality. Further, if a network computer user desires remote capability long after purchase of a network computer system, the user can purchase remote operator interface 40 as a peripheral device at a later date.

In the illustrated configuration, remote operator interface 40 couples network computer system 50 via connector 54 and allows I/O features to be duplicated on remotely located remote operator interface 40. Remote operator interface 40 is relatively small and can be fastened to keyboard 56 or possibly to monitor 36. Although remote operator interface is not intended to be placed into a shirt or pants pocket, remote operator interface 40 is pocket-sized in dimension. Remote operator interface 40 is approximately 2×2×3. However, it could be as large as 6×6×6 and still provide desirable results.

If cable 58 is over 10 feet in length, amplification of the signals provided by remote operator interface 40 to base unit 32 might be required. Additionally, it is preferred to utilize shielded cable or twisted pair cable for the interconnection of audio signals. Shielded cable reduces the susceptibility of network computer system 50 to electrical noise in the environment which may couple onto conductors and create interference in network computer system 50.

Figure 3:
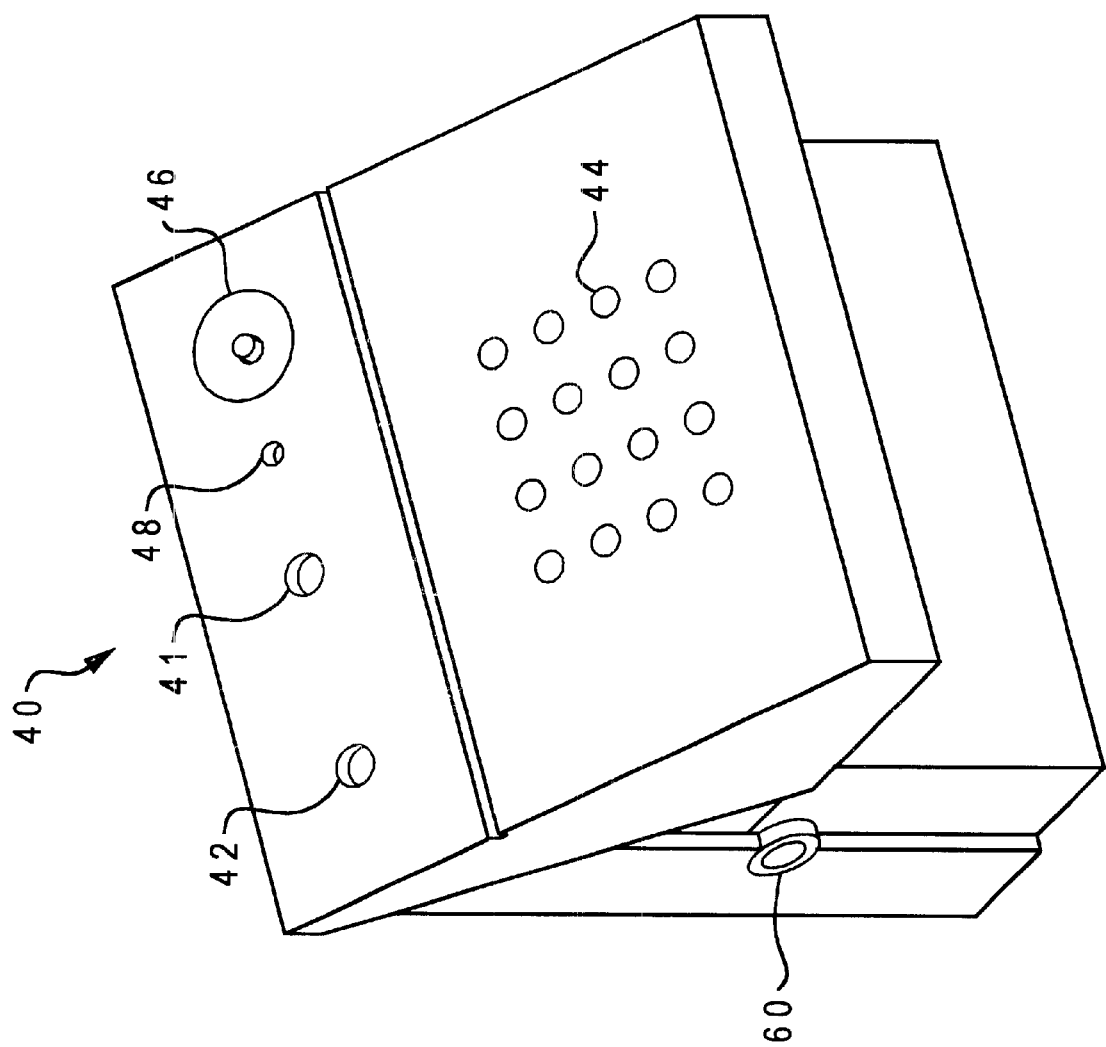
FIG. 3 is a more detailed illustration of a remote operator interface in accordance with one embodiment of the present invention.

Referring now to FIG. 3, a more detailed illustration of a remote operator interface 40 in accordance with one embodiment of the present invention is depicted. In FIGS. 2 and 3 like elements retain like reference call-out numerals. The individual components of the illustrated remote operator interface 40 include speaker 44, ON/OFF switch 46, power indicator 48, microphone jack 42, and headphone jack 41.

The I/O components depicted in FIG. 3 are merely a subset of the possible hardware or a possible arrangement of hardware of the present invention. The illustrated embodiment should not be viewed in a limiting manner. For example, no security features or communication hardware such as integrated circuits are depicted.

One important innovation of remote operator interface 40 is its relatively small size. Remote operator interface 40 only consumes a small area of desk-top or work-space in front of a user. Space efficiency is particularly important because operator interaction with remote operator interface 40 requires remote operator interface 40 to be in close proximity to a network computer operator.

Figure 1:
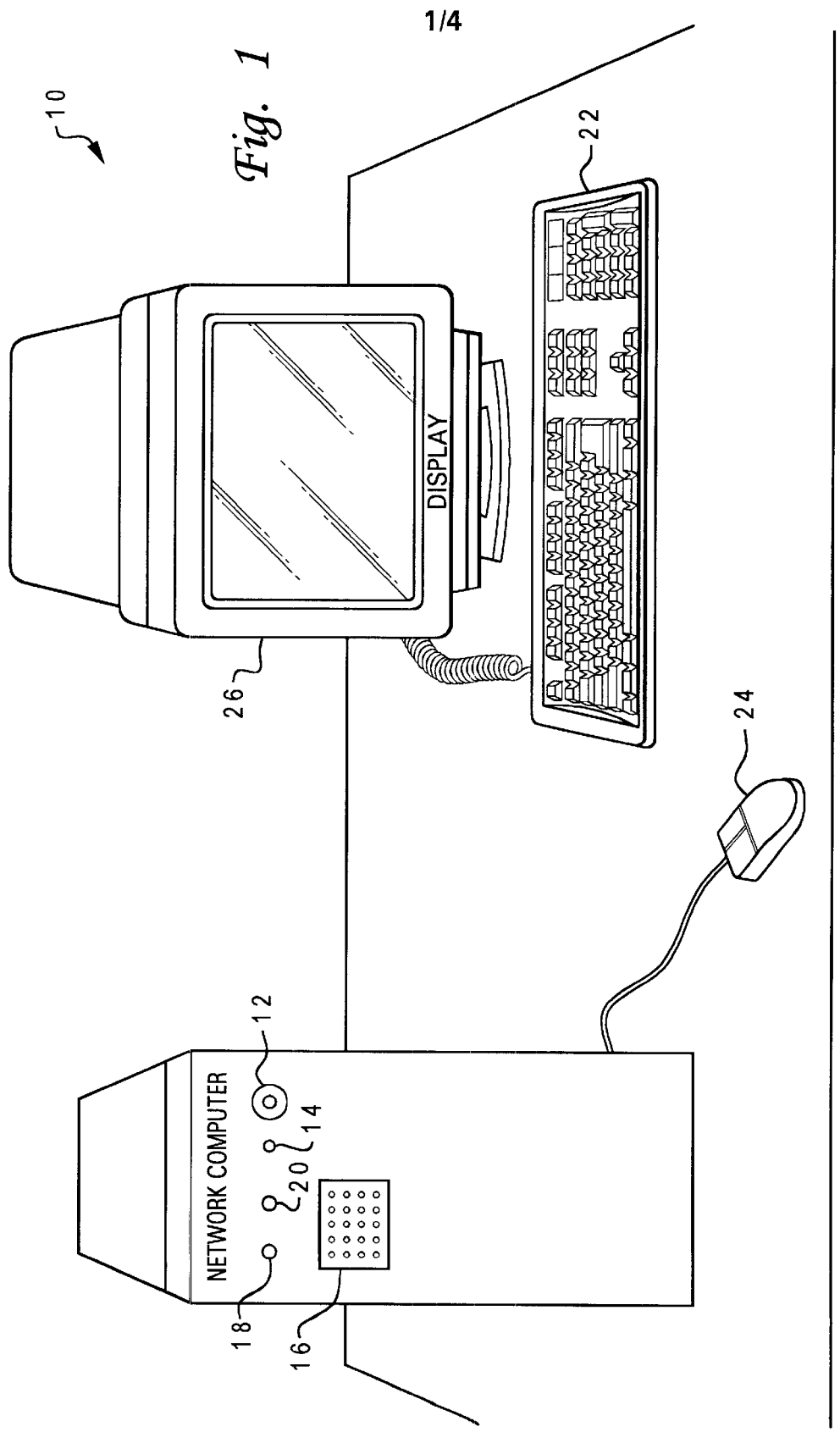
FIG. 1 is a pictorial representation of a conventional network computer.

Remote operator interface 40 is substantially smaller than a standard keyboard. Therefore, the amount of desk-top work space required to provide for the interface and control of a network computer is greatly reduced by the present invention. The efficient utilization of work-space provided by the present invention can be observed by contrasting FIGS. 1 and 2. Hinged 60 provides a pivot point for fastening remote operator interface to a keyboard.

The size of remote operator interface 40 is primarily dictated by the size of speaker 44. The electrical devices such as jacks, switches and indicators which comprise remote operator interface 40 can be miniature, and therefore, the devices can be densely packaged. To reduce manufacturing costs, speaker 44, ON/OFF switch 46, power indicator 48, microphone jack 42, and headphone jack 41 can be soldered onto a printed circuit board utilizing a bulk soldering process.

Miniature audio jacks such as a microphone jack 42 and headphone jack 41, typically consume a volume of less than ½ square inch. Additionally, a typical power indicator 48 and ON/OFF switch 46 would require less than approximately ½ square inch of volume. It is well known by those having skill in the art that volume and tone quality are largely dictated by the size of a speaker utilized in a design. The size of configurable remote operator interface 40 is largely dictated by the size of the speaker utilized. Hence, there is a design trade off between size and sound performance.

Figure 4:
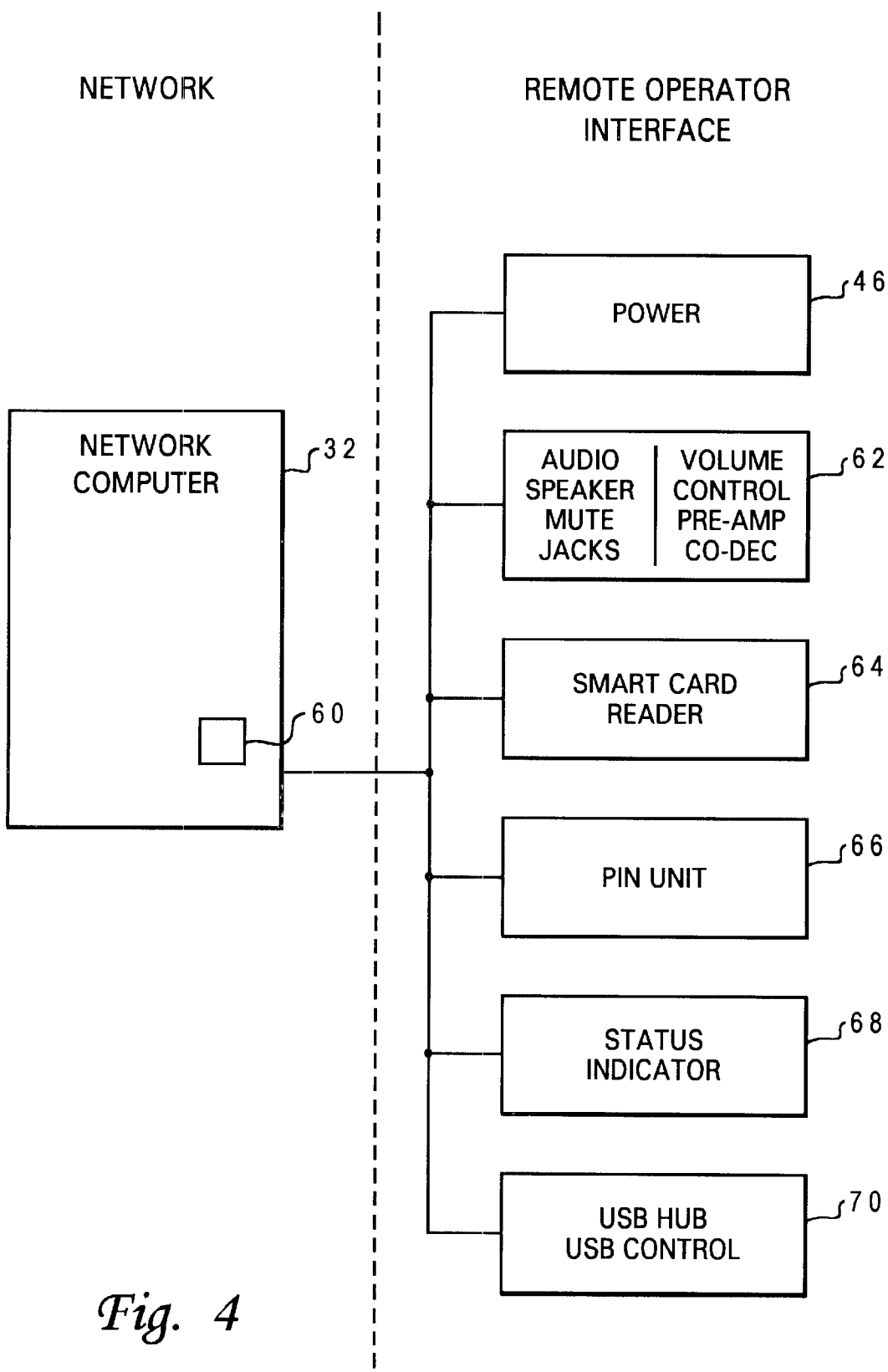
FIG. 4 illustrates a block diagram for a system configuration of a network computer and a remote operator interface in accordance with one embodiment of the present invention.

Referring now to FIG. 4, a block diagram of desirable features which remote operator interface 40 can provide are illustrated. In accordance with FIGS. 2 and 3, a power switch or ON/OFF switch 46 controls power relay 60. Power relay 60 provides power to base unit 32 in response to the status of ON/OFF switch 46. In a preferred embodiment, ON/OFF switch 46 is wired in parallel with a momentary switch on base unit 32.

Audio interface 62 accepts user input and provides user feed-back. Audio interface 62 can include a 10 speaker, audio jacks, a mute selection switch, volume control, and audio signal processing functions such as a pre-amp and a coder/decoder (CO-DEC). A Pre-amp maybe required to provide amplification for the audio signal received from the microphone jack. Additionally, the CO-DEC may be utilized to provide an analog to digital conversion for the signal received via microphone jack.

The CO-DEC could also provide digital to analog conversion for a digital audio signal transmitted by base unit 32 and received by remote operator interface 40. It is preferred to utilize digital audio because increased bandwidth and increased noise suppression can be achieved by digital communication.

It is preferred that all of the audio components such as the jacks, switches, indicators, pre-amp and CO-DEC are secured to a printed circuit board. A printed circuit board allows for the required electrical-mechanical interconnection and reduces assembly costs.

Smart card reader 64 provides security to an entire computer network by limiting access to the network computer system. Smart card reader 64 requires a user to provide positive identification via an identification card before accessing the computer network. Network security is an important feature. Identification of individuals who access a computer network utilizing the network computer system of the present invention can be stored into memory somewhere in the computer network.

PIN unit 66 can also provide security to the computer network. PIN unit 66 receives a personal identification number (PIN) and compares the received PIN number with valid or authorized PIN numbers. If the PIN number entered is valid, the requester is allowed to control network computer system 50 of FIG. 2.

Status indicator interface 68 provides user input such as power status, activity status, and data rates. This allows a user to quickly determine system status without having to request data utilizing a keyboard or a mouse and a monitor.

A port on base unit 32 which conforms to IEEE RS232 standards could be utilized to interface remote operator interface 40 to base unit 32. The IEEE RS232 standard is well known by those having skill in the art and will not be discussed herein.

USB hub 70 is an interface which can transmit and receive audio or data on a universal system bus (USB). USB hub also allows the present invention to be compatible with existing ports on a network computer. Additionally, remote operator interface 40 can contain a USB hub. In this embodiment, any peripheral can be plugged into USB hub 70 and operate remotely utilizing remote operator interface 40 as a connection point to access the entire computer network.

A USB has well defined protocols for handling audio data. When a USB is utilized to process and communicate audio in the present invention, the audio signal must pass directly to the USB hardware and by-pass other audio sub-systems.

While the invention has been particularly shown and described with reference to a preferred embodiment, it will be understood by those skilled in the art that various changes in form and detail may be made therein without departing from the spirit and scope of the present invention.

What is claimed is:

1. A remote operator interface for a network computer having a first plurality of physical input and output interface devices including at least a power switch and a power indicator, comprising:

a pocket-sized structural enclosure for remotely mounting a second plurality of physical input and output interface devices including at least a power switch and a power indicator, said second plurality of physical input and output interface devices for providing a remote operator interface which can control a network computer; and means for electrically coupling said second plurality of physical input and output interface devices to said first plurality of physical input and output interface devices at said network computer, wherein said means for electrically coupling allows a network computer to be remotely located from said remote operator interface and be controlled by an operator at said remote operator interface.

2. The remote operator interface according to claim 1, further comprising a mounting structure for mounting said remote operator interface to a keyboard in close proximity to a network computer operator.

3. The remote operator interface according to claim 1, wherein said means for electronically coupling said remote operator interface to said network computer further includes an electrically conductive cable.

4. The remote operator interface according to claim 1, wherein said means for electronically coupling said remote operator interface to said network computer further includes an optical communication.

5. The remote operator interface according to claim 1, further comprising a connector for interfacing said structural enclosure to said computer.

6. The remote operator interface according to claim 1, wherein said first and second pluralities of physical input and output interface devices each include a speaker and an audio jack.

7. The remote operator interface according to claim 1, further comprising a printed circuit board mounted in said structural enclosure mounting said second plurality of physical input and output interface devices.

8. The remote operator interface according to claim 1, further comprising preamplifier mounted in by said structural enclosure.

9. The remote operator interface according to claim 1, further comprising a microphone jack mounted in said structural enclosure and coupled to a second microphone jack at said network computer.

10. The remote operator interface according to claim 1, wherein said operator interface communicates with said network computer utilizing digital signals.

11. The remote operator interface according to claim 1, further comprising a card reader.

12. The remote operator interface according to claim 1, further comprising a universal serial bus (USB) interface, wherein said remote operator interface communicates utilizing a universal serial bus (USB) protocol.

13. The remote operator interface according to claim 1, further comprising a RS232 bus interface, wherein said remote operator interface communicates utilizing a RS232 protocol.

* * * * *